United States Patent
Sennewald et al.

[15] 3,691,096
[45] Sept. 12, 1972

[54] PREPARATION OF A CARRIER-SUPPORTED CATALYST

[72] Inventors: Kurt Sennewald, Hurth-Hermulheim; Heinz Erpenbach, Surth near Cologne; Wilhelm Vogt, Efferen near Cologne; Winfried Lork, Erftstadt Friesheim; Peter Prinz, Hurth-Burbach, all of Germany

[73] Assignee: Knapsack Aktiengesellschaft, Knapsack near Cologne, Germany

[22] Filed: Aug. 21, 1970

[21] Appl. No.: 66,120

[30] Foreign Application Priority Data

Sept. 22, 1969 Germany..........P 19 47 830.9

[52] U.S. Cl. ..................252/437, 252/443, 252/456, 252/464, 260/533 N, 260/604 R
[51] Int. Cl. .............................................B01j 11/82
[58] Field of Search......252/435, 437, 470, 443, 456, 252/464

[56] References Cited

UNITED STATES PATENTS 3,565,826    2/1971    Sennewald et al.........252/437

*Primary Examiner*—Patrick P. Garvin
*Attorney*—Connolly and Hutz

[57] ABSTRACT

Preparation of a carrier-supported catalyst consisting of oxides of iron, bismuth, molybdenum and optionally silver and phosphorus in the atomic ratio of $Ag_{0-1.5}Fe_{0.1-12} Bi_{0.1-12}P_{0-5}Mo_{12}O_{30-110}$, and of silicon carbide, aluminum oxide or silicon dioxide as the carrier. The catalyst is prepared in two steps. In the first step a porous carrier is impregnated at least once with an aqueous solution of a molybdenum compound and the water is evaporated; in the second step, the said carrier is impregnated at least once, at temperatures of between 20° and 100°C, with an aqueous nitric acid solution of iron, bismuth and optionally silver nitrates and optionally phosphoric acid; after the last impregnation, the carrier so treated is allowed to remain in contact with the said aqueous nitric acid solution for a period of between 5 and 24 hours, water and nitric acid are evaporated with continuous agitation of the carrier, and the carrier with the said salts adhered thereto is dried at temperatures of between 100° and 300°C, and annealed at temperatures of between 450° and 550°C.

12 Claims, No Drawings

PREPARATION OF A CARRIER-SUPPORTED CATALYST

The present invention relates to a process for the manufacture of a carrier-supported catalyst consisting of oxides of iron, bismuth, molybdenum and optionally silver and phosphorus in the atomic ratio of $Ag_{0-1.5}Fe_{0.1-120.1-12}P_{0-5}Mo_{12}O_{30-110}$, and of silicon carbide, aluminum oxide or silicon dioxide as the carrier, for use in the catalytic gas phase oxidation of propylene to produce acrolein and/or acrylic acid, and of acrolein to produce acrylic acid.

Such catalyst, which may be used with or without carrier for the above purpose, has already been described in Belgian Pat. No. 717 517, and a process for the manufacture of acrylic acid with the use of the catalyst aforesaid, which may be deposited on a carrier, has been reported in earlier U.S. Pat. application Ser. No. 847,734 filed Aug. 5, 1969.

These catalysts have been prepared heretofore by the addition, for example, of molybdenum oxide or ammonium molybdate in the form of solid material or in the form of an aqueous or phosphoric acid solution to a nitric acid solution of iron, bismuth and optionally silver salts so as to immediately obtain a suspension of molybdates. Following evaporation, drying and sintering, a catalyst ready for use was obtained.

The catalysts so prepared can be used for reaction in the form of crushed material, granulates or compressed pellets. During the reaction period, however, they are found to undergo a change in structure, which is occasioned, for example, by migration of molybdenum oxide, or by a change in valency of the oxide/molybdate mixture, This causes break-up of granulates or pellets into fine catalyst dust or fine catalyst fragments. If used in a fixed bed tubular reactor for the oxidation of propylene and/or acrolein, the catalyst is found to forbid technical operation therein, after a certain period. Variations in resistance, which occur across the individual catalyst-receiving tubes and are occasioned by the break-up of the catalyst, no longer permit the uniform supply of gas to all of the catalyst-receiving tubes.

Catalysts, which are prepared by stirring colloidal silicic acid, for example, into a catalyst suspension (or inversely), successively drying and calcining the resulting mixture, and crushing it or compressing it into pellets, can also scarcely be expected to be qualified for technical uses bearing in mind that they combine disadvantages the same as those reported above with a very limited abrasion resistance.

Catalysts which are adhered in the form of a suspension to a porous carrier have a poor bond strength and are rapidly removed from the carrier by abrasion. This is occasioned by clogging of the fine pores of the carrier, which then merely enable minor catalyst proportions to penetrate thereinto with the result that the catalyst has a very limited activity only.

The present invention now provides a process for the preparation of a carrier-supported catalyst, which comprises adhering an aqueous solution of ammonium heptamolybdate [$(NH_4)_6Mo_7O_{24} \cdot 41\ H_2O$] or phosphomolybdic acid [$P_2O_5 \cdot 24\ MoO_3 \cdot x\ H_2O$] to an inert porous carrier by impregnating the carrier once or several times with the said solution, and subsequently evaporating the water.

The ammonium heptamolybdate adhered to the carrier may be transformed subsequently into molybdenum oxide by heating the carrier to a temperature of between 450° and 550°C. Following this, the solution of iron, bismuth and optionally silver salts in nitric acid, which may also contain phosphoric acid, is adhered to the carrier having molybdenum oxide or ammonium heptamolybdate thereon by impregnating the said carrier again once or several times with the said solution, at a temperature of between 20° and 100°C, preferably between 40° and 70°C. The step(s) of impregnating is (are) carried out each time while using a quantity of salt solution which corresponds to the maximum absorptivity of the carrier so as to ensure uniform distribution of the salt all over the carrier.

Following the last impregnation, the carrier full of absorbed salt solution is maintained at a preferred temperature of between 40° and 70°C, for a period of between 5 and 24 hours. This is done to effect transformation into iron, bismuth, silver and phosphorus molybdates, on the carrier. The nitric acid and water are subsequently evaporated at atmospheric or reduced pressure. While this is done, the catalyst carrier with the compounds adhered thereto should preferably be rotated so as to prevent individual catalyst particles from caking together. Following this, the catalyst mass is annealed first for a period of between 5 and 24 hours at about 250°C, and then for the same period of time at 450° to 550°C. This results in the formation of an abrasion-proof catalyst.

The porous carrier consists of material which should combine a large volume of pores with a low specific surface (as reported by B.E.T. in Journal of Amer. Chem. Soc., volume 60 [1938], 309), e.g. material having a volume of pores of between 0.2 and 2 milliliters per gram and a specific surface of between 0.1 and 150 square meters per gram. The useful carriers chiefly comprise silicon carbide, silicon dioxide and aluminum oxide. It is also possible to use, for example, silicon dioxide having a large volume of pores and a specific surface of more than 150 square meters per gram. The specific surface of the carrier or even that of the finished catalyst can be reduced by slight sintering treatment of the carrier or catalyst. The finished catalyst should have a small specific surface, i.e., a surface of preferably less than about 20 square meters per gram, in order to minimize transformation of propylene into carbon oxides.

In the catalyst so prepared, the active constituents are embedded in the solid carrier frame. As a result, catalyst disintegration during the reaction is not likely to occur, nor the consequential clogging of the tubular reactor. If minor proportions of molybdenum oxide in fact migrate from the carrier, for example during the reaction, then the protecting frame of the carrier will hold together the remaining active catalyst mass.

The process of the present invention permits the preparation of abrasion proof catalysts suitable for use in both fixed bed and fluidized bed reactors.

The catalyst may be subjected to conventional preliminary treatment in the catalyst bed at a temperature of between 400° and 500°C and within a period of between 2 and 5 hours with the use of a gas mixture consisting of 80 percent by volume air and 20 percent by volume steam. Following this, the finished catalyst may be subjected to further pretreatment with the use of dilute propylene/nitrogen/steam-mixtures (Ind. Eng. Chem., volume 49 [1957], 244).

The reaction of propylene or acrolein with oxygen to produce acrylic acid, which does not form part of the present invention, can be carried out by processes such as those described in German Pat. No. 1 241 817 or Belgian Pat. No. 719 874, or by the process described in U.S. Pat. application Ser. No. 847,734 filed Aug. 5, 1969, which uses a multilayer catalyst, and wherein the carrier-supported catalyst of the present invention may be used as the first catalyst or catalyst I for the production chiefly of acrolein (cf. the following use examples 3 and 4). The present invention relates more particularly to a process for the preparation of a carrier-supported catalyst consisting of oxides of iron, bismuth, molybdenum and optionally silver and phosphorus in the atomic ratio of $Ag_{0-1.5}Fe_{0.1-12}Bi_{0.1-12}P_{0-5}Mo_{12}O_{30-110}$, and of silicon carbide, aluminum oxide or silicon dioxide as the carrier, which comprises in a first step at least once impregnating a porous carrier with an aqueous solution of a molybdenum compound and at least once evaporating the water; in a second step at least once impregnating the said carrier at temperatures of between 20° and 100°C, preferably between 40° and 70°C, with an aqueous nitric acid solution of iron, bismuth and optionally silver nitrates and optionally phosphoric acid; after the last impregnation, contacting the carrier so impregnated with the said aqueous nitric acid solution for a period of between 5 and 24 hours at a preferred temperature of between 40° and 70°C; evaporating then water and nitric acid with continuous agitation of the carrier; drying the carrier together with the salts adhered thereto at temperatures of between 100° and 300°C; and annealing the dried carrier at temperatures of between 450° and 550°C.

Further preferred features of the present invention provide a. for the carrier to have a volume of pores of between 0.2 and 2 milliliters per gram;

b. for the carrier to be used in the form of spheroidal or cylindrical particles having a diameter of between 2 and 8 mm;

c. for the carrier to have a particle size of between 10 and 500 microns, preferably between 50 and 200 microns, when used as the carrier of a fluidized bed catalyst;

d. for the carrier to have a specific surface of between 0.1 and 700 square meters per gram, preferably between 1 and 150 square meters per gram;

e. for the finished carrier-supported catalyst to be sintered at about 800°C to reduce its specific surface down to a value of between 0.1 and 40 square meters per gram, preferably between 1 and 20 square meters per gram;

f. for the use of ammonium heptamolybdate or phosphomolybdic acid as the molybdenum compound;

g. for the first step treatment to be completed by subjecting the carrier, which has the molybdenum compound adhered thereto and is freed from the bulk of water, to drying and annealing treatment, the drying step being effected at 100° to 200°C, and the annealing step being effected for a period of between 5 and 24 hours at temperatures of between 450° and 550°C; and h. for the second step treatment to be completed by subjecting the carrier, which has the salts adhered thereto, to annealing treatment for a period of between 5 and 24 hours at temperatures of between 450° and 550°C.

EXAMPLE 1

1,382 grams silicon carbide spheroids (diameter between 6 and 8 mm), which had a volume of pores of between 0.6 and 0.7 milliliter per gram and a surface of 1 square meter per gram, were saturated with 874 grams of a 34 percent aqueous ammonium heptamolybdate solution $[(NH_4)_6Mo_7O_{24} \cdot 4 H_2O]$ in a rotating evaporator. Following evaporation of the water under reduced pressure, a further 548 grams of the same solution were adhered to the carrier, the water was evaporated once again, and the silicon carbide spheroids with the ammonium heptamolybdate adhered thereto were dried for 2 hours at 150° to 200°C and then annealed for 15 hours at 500°C. After the annealing step, 321 grams molybdenum oxide were found to have been adhered to the silicon carbide spheroids. A nitric acid solution of 378 grams iron (III) nitrate, $Fe(NO_3)_3 \cdot 9 H_2O$, 120.5 grams bismuth (III) nitrate, $Bi(NO_3)_3 \cdot 5 H_2O$, 40 grams silver nitrate ($AgNO_3$) and 7.9 grams 30 percent phosphoric acid ($H_3PO_4$) was then prepared, of which 300 milliliters were needed to effect the first saturation of the spheroidal carrier at 60°C. Following this, water and nitric acid were evaporated at such a rate that the remaining 175 milliliters of the above salt solution were just sufficient to saturate the carrier once again.

The silicon carbide spheroids with the salts adhered thereto were then maintained at 60°C for 16 hours, while the evaporator was rotated. The mixture of water and nitric acid was then evaporated. The spheroids were heated to 250°C (10 hours), annealed for 16 hours at 500°C, and 1,651 grams of a carrier-supported catalyst of the formula $Ag_{0.12}Fe_{5.3} Bi_{1.2}Mo_{12}P_{0.15}O_x$ were obtained. The catalyst was ready for use. It consisted of 20 weight percent active mass and 80 weight percent silicon carbide.

EXAMPLE 2

782 grams silicic acid beads (diameter between 4 and 5 mm), which had a surface of 62 square meters per gram and a volume of pores of 0.9 milliliter per gram, were impregnated with 915 grams 40 percent ammonium heptamolybdate solution. The water was distilled off under a vacuum of 20 mm Hg and the silicic acid beads were impregnated a second time, this time with 460 grams of the same solution. The water was distilled off once again, the carrier beads were subsequently annealed for 12 hours at 470° to 480°C, and impregnated thereafter at 70°C with 570 milliliters of a nitric acid solution of 498 grams $Fe(NO_3)_3 \cdot 9 H_2O$, 160.5 grams $Bi(NO_3)_3 \cdot 5 H_2O$, 6.1 grams $AgNO_3$ and 10.55 grams 30 % $H_3PO_4$. After a further 18 hour heat treatment at 70°C, the mixture of water and nitric acid was evaporated under water-jet vacuum. The dry catalyst spheroids were then heated from 120° to 490°C within 30 hours. After that time, all nitrous gases were found to have been evaporated. 1,385 grams catalyst of the formula $Ag_{0.12}Fe_{5.3}Bi_{1.2}P_{0.15}Mo_{12}O_x$ were obtained. It consisted of 43.2 weight percent active mass and 56.8 weight percent silicic acid.

As the catalyst so prepared was found to have a "-BET"- surface of 26 square meters per gram and as it would transform too much propylene into carbon oxides, it was subjected to a further 30 minute heat treatment at 800°C. This short sintering step enabled the surface of the catalyst to be reduced from 26 square meters per gram down to 13 square meters per gram.

EXAMPLE 3 (USE OF CATALYST)

A tubular reactor having an internal diameter of 30 mm, which was maintained by means of a salt bath at 380°C was charged sequentially with 1,070 milliliters of the carrier-supported catalyst (catalyst I) of Example 1 and with 535 milliliters of a catalyst II having the composition $CoMoO_4$ in the form of pellets with the dimensions of 4 · 2.5 mm. Catalyst II was additionally diluted with 270 milliliters silicon carbide granules.

Recycle gas was passed over the two catalysts in a direction such that the gas first contacted catalyst I and then catalyst II. The recycle gas was used at a rate of 2.5 normal cubic meters (S.T.P.) per hour. It was fed per hour with 192 grams propylene and with such a quantity of oxygen that the gas entering the reactor had the following composition by volume: 10.7 percent propylene, 11.3 percent oxygen, 2.5 percent acrolein, 20.0 percent steam, 30.0% $CO_2$, 22.0% CO, 3.5 percent balance gas ($H_2$, $C_2H_4$, $C_3H_8$ and similar gases). The reaction gas was scrubbed with 600 milliliters water per hour in a bubble tray column which was operated at 64°C, and 217 grams/hour acrylic acid were obtained in the form of a 21.5 percent aqueous solution. The acrylic acid yield was 66.0 percent, based on the propylene added, or 70.7 percent, based on the propylene transformed, for a catalyst activity of 135 grams acrylic acid per liter of catalyst per hour.

Some formaldehyde and maleic acid were obtained together with an additional acetic acid yield of 6 percent, based on the propylene conversion rate. The reaction gas was found to contain 2.7 percent by volume acrylic acid.

EXAMPLE 4 (USE OF CATALYST)

A tubular reactor having an internal diameter of 30 mm, which was heated to 380°C by means of a salt bath, was charged sequentially with 1,000 milliliters of the carrier-supported catalyst (catalyst I) prepared in the manner described in Example 2, and with 500 milliliters of a catalyst II having the composition $CoMoO_4$ in the form of pellets with the dimensions of 4 · 2.5 mm. Catalyst II was additionally diluted with 250 milliliters silicon carbide spheroids. 2.5 normal cubic meters recycle gas were passed per hour over the two catalysts in a direction such that the gas first contacted catalyst I and then catalyst II. Its composition by volume of 11.5 percent propylene, 12.0 percent oxygen, 3.0 percent acrolein, 50.5% $CO_2$ and CO, 20.0 percent steam, 3.0 percent balance gas ($C_2H_4$, $C_3H_8$ and similar gases) was kept fairly constant by the supply of 218 grams/hour propylene (5.19 mols) and replacement of the oxygen transformed.

The reaction gas was extracted with 400 milliliters/hour water and 250 grams/hour acrylic acid (3.47 mols) were obtained in the form of a 26.3 percent aqueous solution, corresponding to a yield of 66.9 percent, based on the propylene added, or 69.8 percent, based on the propylene transformed. 94 liters per hour off-gas were removed from the cycle. The reaction gas was found to contain 3.1 percent by volume acrylic acid. Acetic acid was obtained in a yield of 5.8 percent, based on the propylene transformed. The catalyst activity was 167 grams acrylic acid per liter of catalyst per hour.

The test results obtained in Examples 3 and 4 show that the carrier-supported catalysts prepared in accordance with the present invention produce acrylic acid yields and have activities approaching those of conventional catalysts (cf. U.S. Pat. application Ser. No. 847,734, filed Aug. 5, 1969. In clear contrast with carrier-supported catalysts prepared in conventional manner, those of the present invention could, however, not be found to undergo abrasion, which is a decisive criterion for carrying out the fixed bed process on an industrial scale. Abrasion test results are indicated in the following Table for the purpose of comparison. The loss caused by abrasion was determined for the catalysts of the present invention, which are numbered 1, 2 and 3, and for conventional catalysts, which are numbered 4 to 8, in a cylindrical stainless steel vessel in which was placed a screening drum receiving weighed portions of catalyst. The drum was rotated at a speed of 180 rpm. The abrasion fines were determined by screening out the treated catalyst, and are expressed in percent loss caused by abrasion.

TABLE

| No. | Composition of catalyst | Shape of catalyst | Carrier | Loss caused by abrasion in % |
|---|---|---|---|---|
| 1 | $Ag_{0.12}Fe_{5.3}Bi_{1.2}P_{0.15}Mo_{12}O_x$ | 6–8 mm spheroids | 80% SiC | 0 |
| 2 | $Ag_{0.12}Fe_{5.3}Bi_{1.2}P_{0.15}Mo_{12}O_x$ | 4–5 mm spheroids | 56.8% $SiO_2$ | 0 |
| 3 | $Ag_{0.12}FE_{5.3}Bi_{1.2}P_{0.15}Mo_{12}O_x$ | 0.05–0.2mm spheroids | 57% $SiO_2$ | 0.2 |
| 4 | $Ag_{0.12}Fe_{5.3}Bi_{1.2}P_{0.15}Mo_{12}O_x$ | 4.3 mm pellets | — | 16 |
| 5 | $Ag_{0.12}Fe_{1.11}Bi_{0.3}P_{0.13}Mo_{12}O_x$ | 5.3 mm pellets | — | 34 |
| 6 | $Ag_{0.12}Fe_{1.11}Bi_{0.3}P_{0.13}Mo_{12}O_x$ | 5.3 mm pellets | 10% $SiO_2$ | 62 |
| 7 | $Fe_7Bi_2P\ Mo_{12}O_x$ | granules | 40% $SiO_2$ | 36 |
| 8 | $Ag_{0.12}Fe_{1.11}Bi_{0.3}P_{0.13}Mo_{12}O_x$ | spheroids | 50% $SiO_2$-0.2mm | 28 |

We claim:

1. A process for the preparation of a carrier-supported catalyst consisting of oxides in the atomic ratio of $Ag_{0-1.5}\ Fe_{0.12-12}Bi_{0.1-12}P_{0-5}Mo_{12}O_{30-110}$, and of silicon carbide, aluminum oxide or silicon dioxide as the carrier, which comprises in a first step at least once impregnating a porous carrier with an aqueous solution of a molybdenum compound selected from the group consisting of ammonium heptamolybdate and phosphomolybdic acid and at least once evaporating the water; in a second step at least once impregnating the said carrier at temperatures of between 20° and 100°C, with mixtures consisting of an aqueous nitric acid solution of (1) iron and bismuth nitrates, (2) iron and bismuth nitrates together with silver nitrate, (3) iron and bismuth nitrates together with phosphoric acid, and (4) iron and bismuth nitrates together with silver nitrate and phosphoric acid; after the last impregnation, contacting the carrier so impregnated with the said aqueous nitric acid solution for a period of between 5 and 24 hours, evaporating then water and nitric acid with continuous agitation of the carrier; drying the carrier together with the salts adhered thereto at temperatures of between 100° and 300°C; and annealing the dried carrier at temperatures of between 450° and 550°C.

2. The process as claimed in claim 1, wherein the carrier has a volume of pores of between 0.2 and 2 milliliters per gram.

3. The process as claimed in claim 1, wherein the carrier is used in the form of spheroidal or cylindrical particles having a diameter of between 2 and 8 mm.

4. The process as claimed in claim 1, wherein the carrier has a particle size of between 10 and 500 microns for use as the carrier of a fluidized bed catalyst.

5. The process as claimed in claim 1, wherein the carrier has a specific surface of between 0.1 and 700 square meters/gram.

6. The process as claimed in claim 5, wherein the finished catalyst is sintered at about 800°C to reduce its specific surface down to 0.1 to 40 square meters per gram.

7. The process as claimed in claim 1, wherein the first step treatment is completed by drying and annealing the carrier, which has the molybdenum compound adhered thereto and is freed from the bulk of water, the drying step being effected at 100° to 200°C and the annealing step being carried out for 5 to 24 hours at 450° to 550°C.

8. The process as claimed in claim 1, wherein the second step treatment is completed by subjecting the carrier, which has the salts adhered thereto, to annealing treatment for 5 to 24 hours, at 450° to 550°C.

9. The process as claimed in claim 1, wherein the aqueous nitric acid solution contains iron, bismuth and silver nitrates.

10. The process as claimed in claim 1, wherein the aqueous nitric acid solution contains iron nitrate, bismuth nitrate and phosphoric acid.

11. The process as claimed in claim 1, wherein the aqueous nitric acid solution contains iron nitrate, bismuth nitrate, silver nitrate and phosphoric acid.

12. The process as claimed in claim 1, wherein, following the last impregnation in the second step, the carrier is contacted with the aqueous nitric acid solution for a period of between 5 and 24 hours at 40° to 70°C.

* * * * *